July 8, 1947. L. E. LEONARD 2,423,714
ELECTRODE CLAMP
Filed June 29, 1943 4 Sheets-Sheet 3

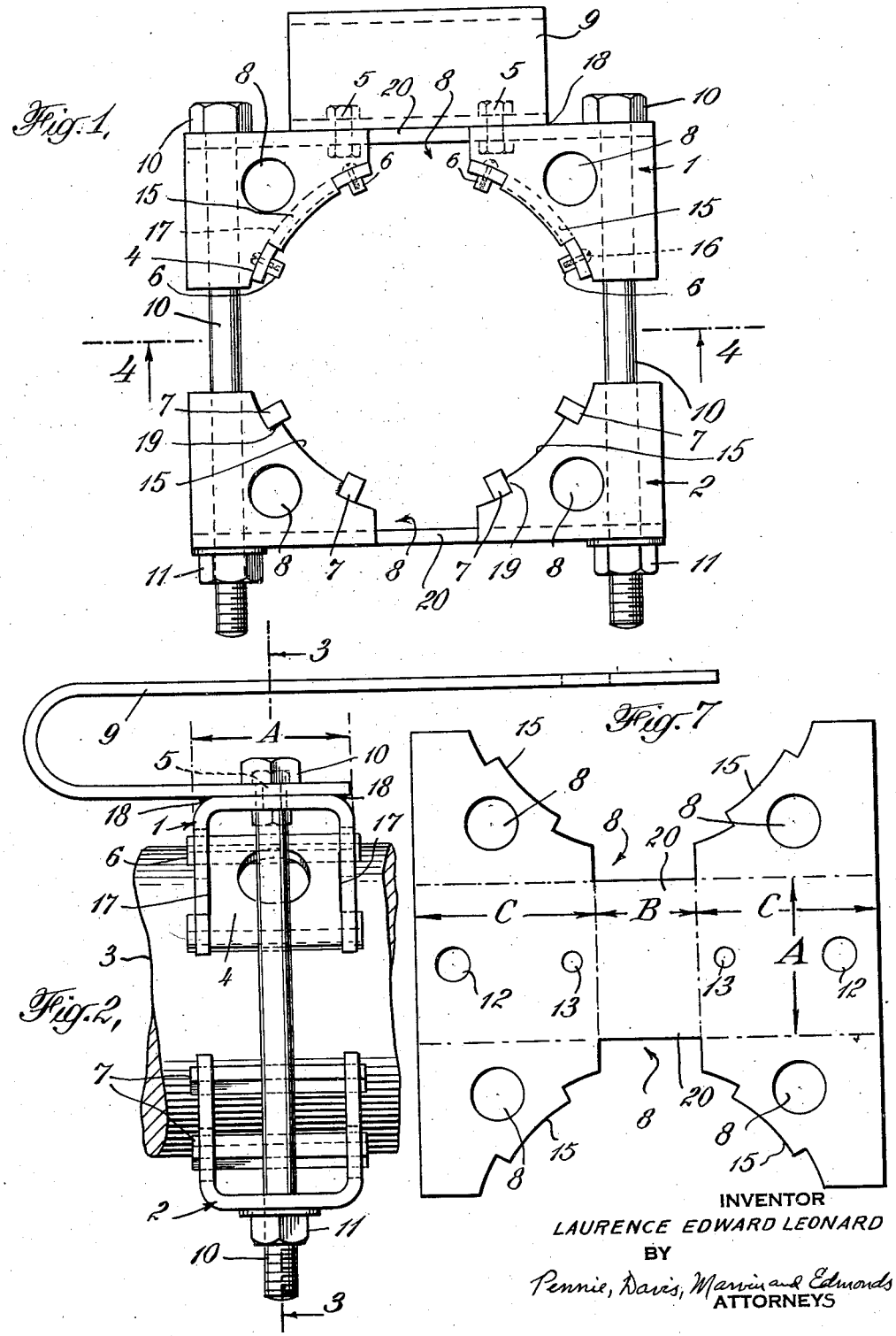

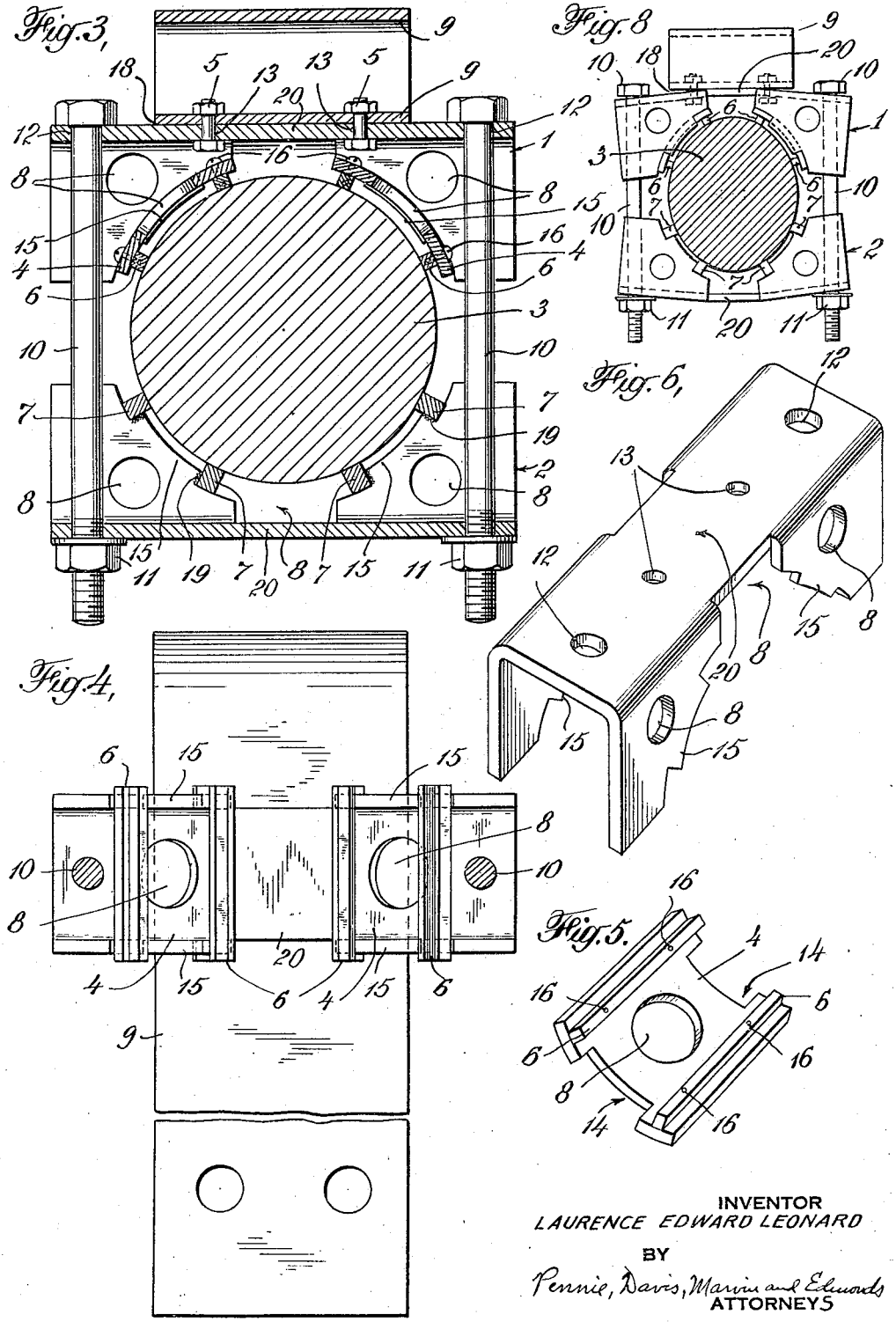

INVENTOR
LAURENCE EDWARD LEONARD
BY
Pennie, Davis, Marvin Edmonds
ATTORNEYS

July 8, 1947.  L. E. LEONARD  2,423,714
ELECTRODE CLAMP
Filed June 29, 1943  4 Sheets-Sheet 4

INVENTOR
LAURENCE EDWARD LEONARD
BY
Pennie, Davis, Marvin & Edmonds
ATTORNEYS

Patented July 8, 1947

2,423,714

UNITED STATES PATENT OFFICE 2,423,714

ELECTRODE CLAMP

Laurence Edward Leonard, Trail, British Columbia, Canada, assignor to The Mathieson Alkali Works, Inc., New York, N. Y., a corporation of Virginia Application June 29, 1943, Serial No. 492,747

9 Claims. (Cl. 204—297)

This invention relates to clamps for making electrical connections with electrodes, and is especially applicable to large electrodes used in electrolytic cells.

Electrodes, especially those employed as anodes in electrolytic cells, are usually in the form of large and heavy carbon or graphite bars of which the shape and condition of the surface are irregular. With such electrodes the rigid clamps heretofore used frequently gave poor surface contact because much of the face of the contacts touched the electrode surface with little pressure, resulting in high contact resistance. Such electrodes must carry very high electric currents, and the clamps are subjected to considerable heat which increases oxidation of the contact surfaces. Furthermore it is necessary to adjust the electrodes in the clamps and to replace them periodically. These requirements introduce problems heretofore solved only in part, and it is the object of this invention to overcome the several disadvantages of the prior structures.

The electrode clamp in accordance with the present invention combines many valuable advantages, among which are the following: A strong mechanical structure which is self-conforming to the contour and surface irregularities of the electrode and which therefore grips it tightly with evenly distributed pressure to all contacts, resulting in low contact resistance; a simple structure of a minimum number of parts which can be readily opened and closed to allow adjustment or change of electrodes; facilities for opening the clamp and replacing the electrode without interfering with or moving the current-carrying elements of the clamp; renewable, non-oxidizing, corrosion-resistant electrical contact members; high electrical conductivity between the surface of the electrode and the clamp; high electrical conductivity within and between the current-carrying parts of the clamp; low thermal conductivity from the electrode to and through the clamp; open construction including ventilation apertures and sufficient metallic area to provide adequate air cooling, but also sufficient cross-sectional area to provide the required electrical conductivity through the clamp; and, under certain conditions, water-cooling of the contacts.

The practice in the art is to water-cool electrode clamps in order to minimize oxidation at the contacts which are commonly of copper or iron. Whereas this accomplishes the purpose to some extent, the result is a loss in efficiency because of the attendant heat loss from the cell or furnace with which the electrodes are used. On the other hand, by employing air-cooled clamps according to the present invention, the temperature at the clamp is not reduced as much as when the clamp is water-cooled, and consequently with the air-cooled clamp the temperature drop along the axis of the electrode, through the cell or furnace cover, is minimized and the heat loss by conduction through the electrode is not as great. Nevertheless, under extreme conditions, as when relatively high electrode current densities are used or the temperature at the clamp unavoidably is relatively high, water-cooling may be desirable, and if carried out according to this invention the heat losses are not excessive and the remaining advantages of the invention are retained.

Briefly, the clamp of the present invention includes a pair of clamp yokes which span the electrode, each yoke comprising two rigid portions integrally connected by a comparatively flexible portion. Attached to each rigid portion is a pair of contacts. Upon drawing the yokes together against the electrode, the flexible portion bends, if necessary, to accommodate the contacts to the contour of the electrode surface, with the result that the pressure is distributed uniformly over all electrode contact surfaces. This result may be achieved with either air-cooling or water-cooling of the clamp.

In making contact between metal and graphite, or the like, the contact resistance is materially decreased by increasing contact pressure. Line or point contacts at high contact pressure introduce lower contact resistance than wider area contacts at low contact pressure. The contact pressure provided by the structure of this invention is not only even, but uniformly high, and the resulting contact potential drop is about one-tenth that of conventional contacts. This is especially important in connection with cells operating on direct current because in such cases the applied potential is frequently not above 5 volts, in which event the contact potential drop might be a large proportion of the applied potential.

The foregoing and other features of the invention will be more apparent upon consideration of the following description taken in connection with the accompanying drawings in which:

Fig. 1 is a top view of an electrode clamp according to the invention, the electrode having been omitted to clarify the drawing;

Fig. 2 is a side view of the clamp with an electrode in place;

Fig. 3 is a sectional view of the clamp and electrode taken along vertical center line 3—3 of Fig. 2;

Fig. 4 is a sectional view of the clamp taken along center line 4—4 of Fig. 1;

Fig. 5 is a perspective view of one of the contact plates;

Fig. 6 is a perspective view of a clamp yoke in accordance with the invention;

Fig. 7 illustrates a clamp yoke after it has been stamped from sheet metal, before bending to its final shape;

Fig. 8 is a sectional view corresponding to that of Fig. 3 showing the manner in which the clamp accommodates itself to an electrode which is "off-round" or otherwise irregular in contour;

Figure 9:
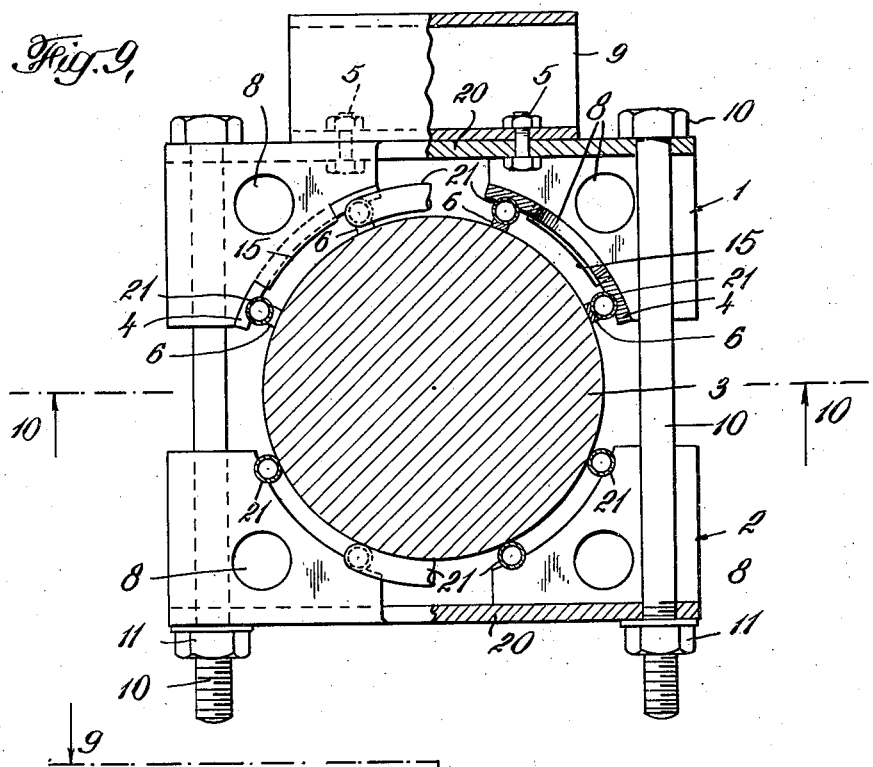
Fig. 9 is a view (partly in section taken along line 9—9 of Fig. 10) of the above-illustrated clamp modified to provide water-cooling.
Figure 10:
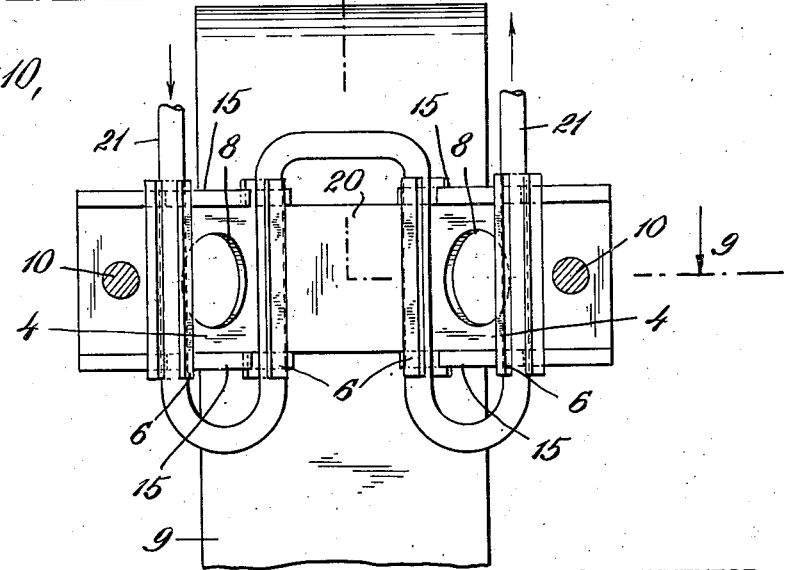
Figure 11:
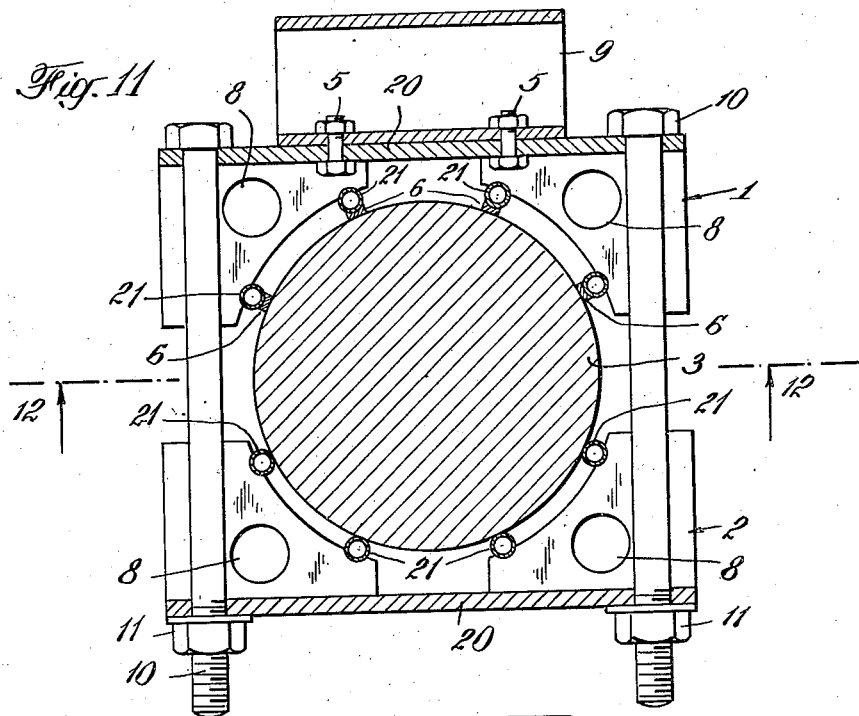
Figure 12:
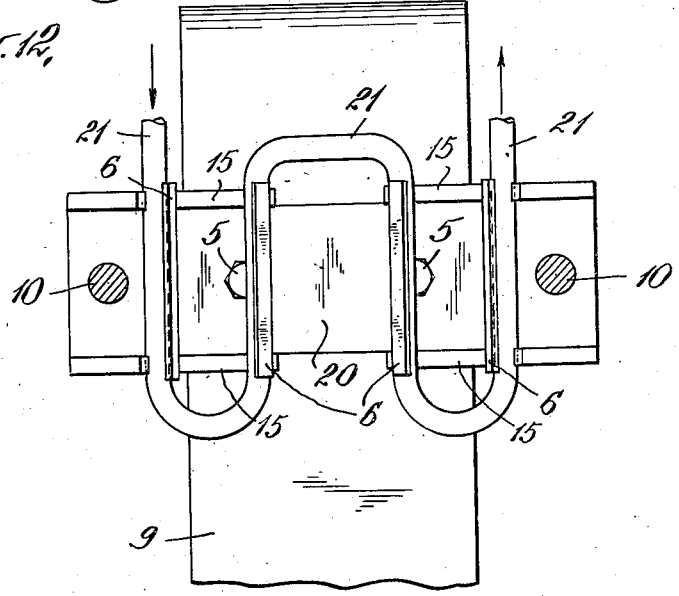

Fig. 10 is a view taken along the center line 10—10 of Fig. 9 showing the assembly of contacts, cooling pipes and contact plates; and Figs. 11 and 12 are views of a simplified form of the water-cooled clamp of Fig. 10, Fig. 11 being a sectional view of a clamp and electrode, and Fig. 12 being a view taken along the center line 12—12 of Fig. 11.

Similar reference characters represent the same or corresponding parts throughout all the figures.

Although the electrode clamp of the present invention may be constructed of any size required by the electrode employed it may be assumed for purposes of illustration that the diameter of the electrode illustrated herein is 6 inches. From this the relative dimensions of the several parts of the described embodiment may be roughly ascertained, except in regard to Fig. 8.

Referring first to Fig. 1, it will be seen that the clamp proper comprises two similar clamp yokes, namely, upper yoke 1 and lower yoke 2, drawn together by two suitable clamping bolts 10. (The yokes are referred to as "upper" and "lower" only for convenience because they so appear in the drawings.) The clamp yokes and bolts may both be of steel, for example. The shape and nature of the clamp yokes is shown more clearly in Fig. 6, the apertures 8 being for ventilation and reduction of thermal conductivity, and the holes 12 being just large enough to accommodate the bolts 10.

Although the clamp yokes could be otherwise formed, an especially convenient manner comprises stamping them from sheet metal of suitable thickness (about ¼" in the example assumed), as shown in Fig. 7, after which holes 8, 12 and 13 may be drilled or punched. The stamping is then formed into the U-shape channel section having the base portion and substantially parallel side walls shown in Fig. 6 by a suitable forming punch which bends it along the lines A indicated in Fig. 7. The back of the channel between the lines A is preferably flat.

The section 20 of the clamp between the lines B (Fig. 7) is not reinforced by channel section, as are the rigid end portions C, and therefore is comparatively flexible. As is more apparent from Fig. 8, when the contour of the electrode 3 is not exactly round (nor rectangular) or is otherwise irregular, the tightening of nuts 11 on bolts 10 draws yokes 1 and 2 together and both yokes bend at section 20 until the several members 6, 7 all press with substantially uniform pressure on the surface of the electrode.

The upper clamp yoke 1 carries members comprising two curved contact plates 4 shown in Fig. 5. These plates, which may be of mild steel to provide strength and low thermal conductivity are formed with end recesses 14 shaped to receive correspondingly shaped lugs 15 carried by distal edges of the side walls of the yoke. These plates may be positioned on the upper yoke by other equivalent interlocking members. Near the longitudinal edge and along the concave surface of each of the upper contact plates 4 is a pair of contact bars or members 6 of contact metal of high electrical conductivity and non-oxidizing properties such as silver, nickel platinum, nickel-copper alloy such as "Monel," or a cemented alloy of the type in which a refractory carbide is cemented with a metal such as cobalt. Such materials are not subject to chemical corrosion and do not form oxides with atmospheric oxygen at the temperatures prevailing; and this construction reduces the required amount of expensive contact metal. The contact bars may be secured to the plate by machine screws 16 which pass through the plate from the back and screw into holes threaded in the silver bars. This arrangement thus results in contacts rigidly connected in pairs, the pairs being secured together by flexible members. The high contact pressure together with low contact resistance introduced by this invention results from the fact that the width of each contact bar is but a small fraction of the circumference of the electrode and is considerably less than the length of the bar. As shown in the drawings, the width of the bar may be of the order of magnitude of $\frac{1}{75}$ of the circumference of the electrode, and of the order of magnitude of $\frac{1}{10}$ or less of the length of the bar. This results in substantially line contact while maintaining a sufficient area of contact.

To increase the electrical conductivity between plate 4 and contact bars 6, it is advisable to silver solder, braze or weld the bars and plate together, and if required, to shape the back of the bar to fit the curvature of the plate. To increase the conductivity further it is usually necessary to weld or braze the contact plates to the upper yoke. This may conveniently be done along the joints 17 between the lugs 15 and recesses 14, Figs. 1 and 2.

The electrode clamp is furnished with electric current through a copper bus bar 9, the end of which preferably is U-shape, as shown in Fig. 2, to allow for slight movement of the clamp. This bus bar should, of course, be of sufficient cross-sectional area to carry the required current, which in one example, was about 833 amperes per anode. The end of the bus bar may be secured to the upper clamp yoke by two bolts 5 which pass through holes 13 in the yoke. To improve the conductivity the joint 18 between the bus bar and the yoke 1 should be brazed. Such brazing, if properly done, will unite the entire adjacent surface areas of bus bar 9 and yoke 1 (Fig. 2), so that even if these two members be separated at the edges 18 by reason of flexure of the flexible section 20, the conductivity provided by the surfaces remaining in contact will be adequate. Of course, a cable or other current supply means could be substituted for the bus bar.

Lower clamp yoke 2, may, for convenience, be identical to upper clamp yoke 1. However, this yoke is not intended to carry the heavy electric current which flows through the upper yoke and therefore the structure may differ in that it requires neither a contact plate nor provision for attaching a bus bar. The flexible section 20 should, however, be included for the reasons mentioned in connection with the upper yoke 1.

Instead of the more expensive contact plates 4, steel bars 7 of rectangular cross-section are secured across the inside concave edges of the side walls of the yoke, as shown in Figs. 1 and 3. These bars may be of the same length as the silver contact bars 6, and should be of the same thickness as that of the silver bars plus the thickness of the contact plate, so as to center the electrode in the clamp. The width of these steel bars may be of the same order of magnitude as, but preferably greater than, the width of the silver bars. These steel bars may be secured to the outside edges of the upper and lower lugs 15 of the lower yoke by a welded joint 19, it being desirable that the contact members and the compression members be located diametrically opposite each other in pairs. Thus bars 7 act as compression means urging the electrode 3 against contact members 6 whereby to make a secure connection both electrically and mechanically, while minimizing heat conduction from the electrode to the clamp. Contact bars 6 obviously also act similarly as compression means.

From the above description it will be evident that the electrode may be released for adjustment in the clamp by merely loosening the two nuts 11. Should the new position present a different contour the clamp yokes will automatically conform thereto when retightened. If the construction of the cell is such that the electrode may be inserted longitudinally, the same loosening of the nuts will allow for the removal and replacement of the electrode. However, if it is necessary to insert the electrode transversely, the nuts 11 may be entirely removed from bolts 10, and the lower yoke slipped off the bolts. Neither of these operations moves or otherwise interferes with the upper yoke structure nor the electrical connections through the elements thereof to the bus bar. The bolts, the lower yoke, and the bars 7 being of conducting material may conduct some current to the electrode, but it is intended that the elements of the upper yoke structure be designed to carry the electrode current.

It will be noted that the clamp according to this invention is not only simple and cheap to construct, but that the construction is such as to minimize heat conduction from the electrode to and through the clamp. To this end, most of the metal of the clamp is spaced away from the electrode and the metallic faces adjacent the electrode are all of small section. Furthermore, no part of the clamp is enclosed and apertures are provided through all portions beneath which heated air might accumulate and through which heat might be conducted.

If, under the prevailing conditions, it is found necessary that the electrode clamp be water-cooled, this may readily be effected, as shown in Figs. 9 and 10, by welding a pipe or pipes 21 to contact plates 4 and brazing the contact bars or members 6 to the pipes so that when in position against the electrode 10 each contact member 6 is backed by a cooling pipe directly in contact with the contact plate 4. In order to facilitate the conduction of heat from the contact member it is preferable to shape the back of it to conform to the curve of the pipe to which it is attached. Thus, although the cooling pipe is located between the contact member and the yoke proper, the contact member is nevertheless secured to the face of the yoke and is electrically connected to it by a highly conductive path. Cooling pipes 21 should be of such strength as to withstand the required compression force and would usually be of steel. They should be connected to a suitable source of cooling liquid and to a waste pipe or cooling tower. The arrows at the broken ends of cooling pipe 21 represent the flow of cooling liquid.

To complete the water-cooling arrangement the compression bars 7 of Figs. 1 and 3 may be replaced by the equivalent pipe or pipes 21 as illustrated, although sometimes it may suffice to water-cool only the contact members on the upper yoke. In this connection, the term "compression members" as employed in the claims is intended to include these equivalent pipes which replace the compression bars. It will be noted that the lower yoke 2 is, in the figure, slightly different from the upper yoke, the lug 15 being extended to the ends of the face of the wall portion on which it is formed, but, as before, the shape of the faces follows the general shape of the adjacent surface of the electrode. Suitable recesses may be cut in these faces, as shown to accommodate and position the pipes 21. Even though there is the mentioned slight difference between the forms of the upper and lower yokes illustrated in Fig. 9, the term "similar" as employed in the claims is intended to embrace both forms. From the foregoing it will be clear that this provision for water-cooling will not affect the self-conforming feature or other advantages of the invention.

The modification shown in Figs. 11 and 12 is a simplified form of the water-cooled construction of Figs. 9 and 10. In general, the present construction is similar to that of Figs. 9 and 10, differing only in that the contact plates 4 are omitted. The construction of the lower yokes 2 may be identical in the constructions of Figs. 9 and 11. In Fig. 11, the construction of the upper yoke proper is represented as identical with that of the lower yoke 2. However, because the upper yoke carries electric current to or from the electrode, the cooling pipes 21 should, of course, carry suitable contact bars or members 6 brazed thereto, as described in connection with Figs. 9 and 10. It is also desirable, as in Fig. 9, that the cooling pipes 21 be welded to both of yokes 1 and 2.

The foregoing description of a preferred embodiment of the invention relates to a clamp intended to hold an electrode of approximately circular or elliptical cross-section. However, it is evident that by slight modification of the shape of the yokes, an electrode of radically different shape could as well be accommodated. For example, if the electrode be of rectangular cross-section, the stamping (Fig. 7) would likewise be rectangular so that the lugs 15 would be formed in a straight line as viewed in Fig. 7, and the contact plate 4 (Fig. 5) would be flat. In such case any irregularity in contour would be automatically accommodated by reason of the self-conforming feature above described. Further modifications within the scope of the invention will be apparent to those skilled in the art.

What is claimed is:

1. An electrode clamp including two similar clamp yokes, each of which is comprised of sheet metal in U-shaped channel section having two side walls connected by a base portion, the yokes being positioned at opposite sides of the electrode with the base portions spaced therefrom and the side walls extending from the base portions toward the electrode, a contact plate secured across the distal edges of the side walls of one of said yokes, said contact plate being formed to follow the general shape of the adjacent surface of the electrode, cooperating interlocking means on said distal edges and the contact plate, a plurality of spaced contact bars secured to said contact plate and bearing against the electrode, said contact bars being of higher electrical conductivity than said contact plate and presenting relatively narrow edges for contact with the electrode, current supply means, electrical connections between said contact bars and said current supply means, and means for urging said yokes together to clamp them about said electrode with said contact bars in contact therewith.

2. An electrode clamp including two similar clamp yokes, each of which is comprised of sheet metal in U-shaped channel section having two side walls connected by a base portion, the yokes being positioned at opposite sides of the electrode with the base portions spaced therefrom and the side walls extending from the base portions toward the electrode, the distal edges of the side walls being formed to follow the general shape of the electrode, a contact plate secured across the distal edges of the side walls of one of said yokes, a plurality of spaced contact bars secured to said contact plate and bearing against the electrode, said contact bars being of higher electrical conductivity than said contact plate and presenting relatively narrow edges for contact with the electrode, current supply means, electrical connections between said contact bars and said current supply means, and means urging said yokes together to clamp them about said electrode with the contact bars in contact therewith.

3. An electrode clamp including two similar clamp yokes, each of which is comprised of sheet metal in U-shaped channel section having two side walls connected by a base portion, the yokes being positioned at opposite sides of the electrode with the base portions spaced therefrom and the side walls extending from the base portions toward the electrode, distal edges of the side walls of both of said yokes being shaped to follow the general shape of the adjacent surface of the electrode, a plurality of spaced contact bars of high electrical conductivity secured across said distal edges of the side walls of one of said yokes and adapted to bear against said electrode, said contact bars presenting relatively narrow edges for contact with said electrode, spaced compression members secured across said distal edges of the other of said yokes, said contact bars and said compression members extending substantially parallel to the axis of the electrode and adapted to space the electrode from the side walls of the yokes, current supply means, connections of high electrical conductivity between said contact bars and said current supply means, and means for drawing said yokes together to cause said compression members to urge the electrode against said contact bars.

4. An electrode clamp including two similar clamp yokes, each of which is comprised of sheet metal in U-shaped channel section having two side walls connected by a base portion, the yokes being positioned at opposite sides of the electrode with the base portions spaced therefrom and the side walls extending from the base portions toward the electrode, lugs formed on the distal edges of the side walls, said edges and said lugs being shaped to follow the general shape of the adjacent surface of the electrode, at least one contact plate having recesses receiving the lugs on the edges of the side walls of one of said yokes, a plurality of spaced contact bars of high electrical conductivity secured to said contact plate and adapted to bear against said electrode, said contact bars presenting relatively narrow edges for contact with said electrode, spaced compression members secured across said distal edges of the other of said yokes, said contact bars and said compression members extending substantially parallel to the axis of the electrode and adapted to space the electrode from the side walls of the yokes, current supply means, connections of high conductivity between said contact bars and said current supply means and means for drawing said yokes together to cause said compression members to urge the electrode against said contact bars.

5. An electrode clamp including two similar clamp yokes, each of which is comprised of sheet metal in U-shaped channel section having two side walls connected by a base portion, the yokes being positioned at opposite sides of the electrode with the base portions spaced therefrom and the side walls extending from the base portions toward the electrode, lugs formed on the distal edges of the side walls of one of said yokes, the edges of the side walls of said yoke and the lugs being shaped to follow the general shape of the adjacent surface of the electrode, at least one contact plate having recesses receiving the lugs on the edges of the side wall of said yoke, a plurality of spaced contact bars of high electrical conductivity secured to said contact plate and adapted to bear against said electrode, said contact bars presenting relatively narrow edges for contact with the electrode, spaced compression members secured across distal edges of the other of said yokes, each of said compression members being located substantially diametrically opposite one of said contact bars, said contact bars and said compression members extending substantially parallel to the axis of the electrode and adapted to space the electrode from the side walls of the yokes and to center it between said yokes, current supply means, connections of high electrical conductivity between said contact bars and said current supply means, and means for drawing said yokes together to cause said contact bars and said compression members to exert a substantially symmetrical pressure against the electrode.

6. An air-cooled electrode clamp including two clamp yokes positioned opposite each other and shaped to receive an electrode between them, one of said yokes being comprised of sheet metal formed in U-shaped channel section having two side walls connected by a base portion, said yoke having its base portion spaced from the electrode and the side walls thereof extending toward the electrode, a lug formed on the distal edge of each of said side walls of said yoke, said lugs being formed to follow the general shape of the adjacent surface of the electrode, two contact plates formed to follow the general shape of said electrode, each of said contact plates having recesses on opposite edges, said contact plates so extending across the space between said side walls of the yoke that the recesses in the opposite walls thereof receive the lugs on the edges of said side walls, a pair of spaced contact bars of material of higher electrical conductivity than that of said contact plates secured to a surface of each of said plates at opposite sides of the recesses therein, said contact bars having relatively narrow edges bearing against the electrode, said contact bars extending substantially parallel to the axis of the electrode, the side walls of said yoke and said contact plates having apertures, means for connecting an electric current supply to said yoke, and means for drawing said yokes together to clamp them about said electrode.

7. An air-cooled electrode clamp as set forth in claim 6 in which the second of said clamp yokes is comprised of sheet metal formed in U-shaped channel section having two side walls connected by a base portion, said second yoke having its base portion spaced from the electrode and the side walls extending towards the electrode, two lugs formed on the distal edge of each of the side walls of said second yoke, said lugs being opposite one another and each being shaped to follow the general shape of the adjacent surface of said electrode, four spaced compression bars extending across the side walls of said second yoke, each of said compression bars presenting relatively narrow edges for contact with said electrode, each compression bar being secured in the angle between the end of a lug and the edge of the side walls on which the lug is formed and diametrically opposite one of the contact members, and apertures through the side walls of said second yoke.

8. A self-conforming electrode clamp comprising a pair of similar yokes, each of which comprises a sheet metal base portion and pairs of side walls extending therefrom at opposite ends thereof, said pairs of side walls being spaced from one another and having distal edges formed to follow the general shape of an electrode, rigid contact members bridging the space between the side walls of each of said pairs of side walls at each end of the base portion of one of said yokes and having relatively narrow edges to contact with an electrode, said yokes being positioned with the spaced side walls of the yokes extending from their respective base plates towards one another, and means for drawing the yokes together to clamp them about an electrode.

9. A self-conforming air-cooled electrode clamp including two similar clamping yokes of comparatively low thermal conductivity each comprising a sheet metal base portion and integral pairs of side walls extending therefrom at opposite ends thereof, the yokes being positioned at opposite sides of the electrode with their base portions spaced therefrom and the side walls at the ends thereof extending from the base portions toward one another, said pairs of side walls being spaced from one another and having distal edges formed to follow the general shape of an electrode to be clamped, the base portions of said yokes between the spaced pairs of side walls being flexible, lugs formed on distal edges of the side walls, said lugs being shaped to follow the general shape of the adjacent surface of the electrode to be clamped, a pair of rigid contact plates of comparatively low thermal conductivity formed to follow the general shape of such electrode, each contact plate having recesses on opposite edges thereof and extending across the space between the side walls at one end of the base plate of one of said yokes, with the recesses receiving the lugs formed on said edges of said side walls, a pair of contact bars of material of lower oxidizing properties than that of said contact plates, secured to a surface of each of said plates, said contact bars presenting relatively narrow edges for contact with the electrode, said contact bars being spaced at opposite sides of the recesses in the ends of the contact plates and positioned to extend substantially parallel to the axis of the electrode to be clamped, apertures through said contact plates and through said walls, means for connecting an electric current supply to the yoke which carries the contact plates and the contact bars, and means for drawing said yokes together to clamp them about an electrode.

LAURENCE EDWARD LEONARD.

REFERENCES CITED

The following references are of record in the file of this patent:

UNITED STATES PATENTS

| Number | Name | Date |
|---|---|---|
| 1,318,992 | Hall | Oct. 14, 1919 |
| 1,856,330 | Greene | May 3, 1932 |
| 1,936,469 | Hill | Nov. 21, 1933 |
| 1,770,839 | Carpenter | July 15, 1930 |
| 2,013,868 | Soderberg | Sept. 10, 1935 |
| 733,602 | Starrett | July 14, 1903 |
| 1,964,736 | Laurin | July 3, 1934 |
| 2,300,893 | Hayford | May 14, 1942 |
| 2,331,255 | West | Oct. 5, 1943 |
| 1,830,947 | Klingel | Nov. 10, 1931 |
| 2,020,285 | Becker et al. | Nov. 12, 1935 |

FOREIGN PATENTS

| Number | Country | Date |
|---|---|---|
| 7,272 | Great Britain | 1900 |